United States Patent

[11] 3,555,289

| | | |
|---|---|---|
| [72] | Inventor | William J. Sobkow<br>Livonia, Mich. |
| [21] | Appl. No. | 758,361 |
| [22] | Filed | Sept. 9, 1968 |
| [45] | Patented | Jan. 12, 1971 |
| [73] | Assignee | Ford Motor Company<br>Dearborn, Mich.<br>a corporation of Delaware |

[54] WINDSHIELD WIPER ENERGIZATION SYSTEM
6 Claims, 4 Drawing Figs.

[52] U.S. Cl. .................................................. 307/10,
307/118; 318/483; 15/250.02
[51] Int. Cl. ...................................................... H02g 3/00
[50] Field of Search ........................................... 307/10,
118; 318/443, 483, 444, WW; 15/250.02, 250.12;
180/(Inquired)

[56] References Cited
UNITED STATES PATENTS

| 2,982,885 | 5/1961 | Becker .......................... | 317/142 |
| 2,407,215 | 9/1946 | Anderson ....................... | 318/483X |
| 3,386,022 | 5/1968 | Redmond, Jr. ................. | 318/483 |

*Primary Examiner*—Robert K. Schaefer
*Assistant Examiner*—H. J. Hohauser
*Attorneys*—John R. Faulkner and E. Dennis O'Connor

ABSTRACT: A motor vehicle windshield wiper energization system wherein a motor driving a windshield wiper is actuated upon moisture on the vehicle windshield being sensed by a moisture sensitive switch. The switch is positioned on a portion of the windshield wiped by the windshield wiper. In order to assure that the windshield is fully cleaned, a time delay mechanism maintains motor operation for a predetermined time period following the removal of moisture from the switch.

PATENTED JAN 12 1971
3,555,289
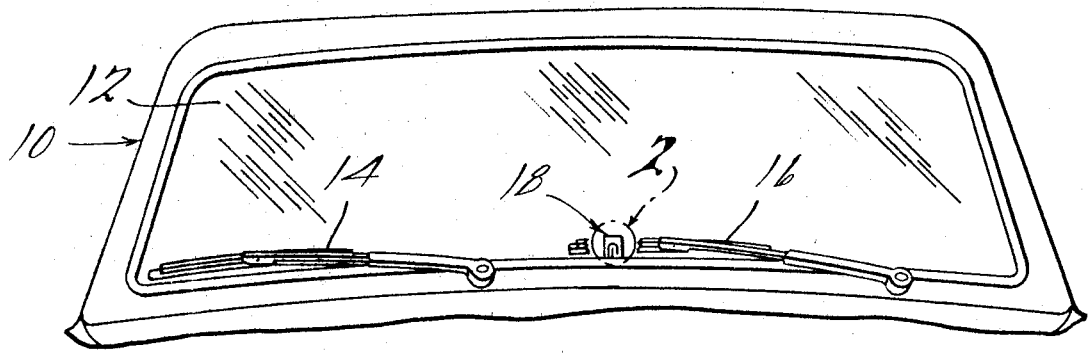
Fig. 1.
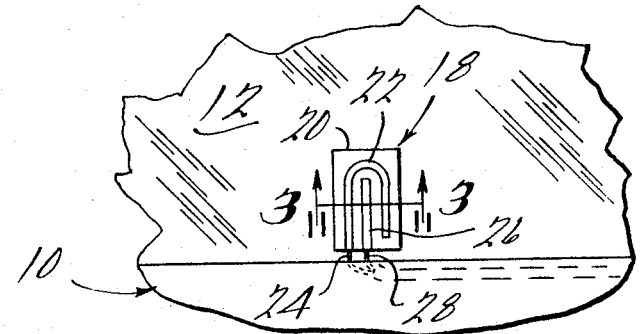
Fig. 2.
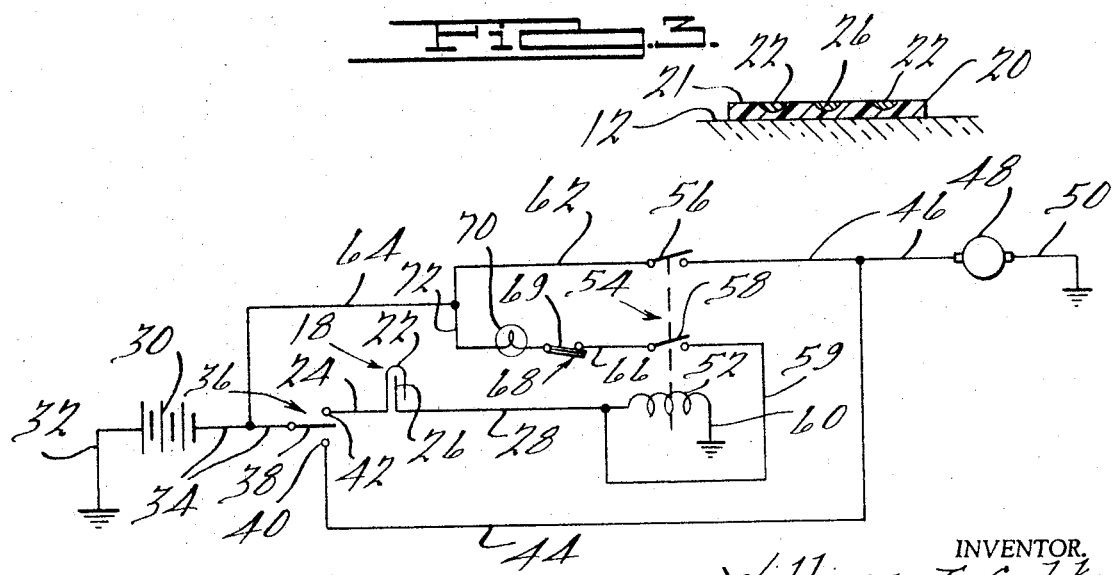
Fig. 3.
Fig. 4.
INVENTOR.
William J. Sobkow
BY John R. Faulkner
E. Dennis O'Connor
ATTORNEYS.

WINDSHIELD WIPER ENERGIZATION SYSTEM

BACKGROUND OF THE INVENTION

Conventional motor vehicle windshield wiper devices include two types of actuation systems. The most common of these types is a direct electrical connection between a power source and a windshield wiper drive motor via a manually operable on-off switch that may allow for single or multiple speed motor operation.

Gaining increasing popularity is the so-called "intermittent" actuation system. The manually operable actuation switch of this system may be positioned such that the windshield wipers are driven through one cycle per predetermined time period. This time period may be varied so that intermittent rather than continuous motor operation is achieved. The purpose of the "intermittent" actuation system is to accommodate windshield cleaning requirements during periods of light rain or road spray impact on the vehicle windshield when continuous wiper operation might be bothersome and/or distracting to the vehicle operator or cause smearing of the moisture to be cleaned.

It is an object of this invention to provide a motor vehicle windshield wiper energization system that controls the actuation of the wiper drive motor to provide for conventional, continuous wiper operation in response to a manual setting of a switch by the vehicle operator, or an automatic operation of the wiper drive motor without the need of a performance of a manual task as required by the prior art arrangements described above. The mode of this automatic operation varies in response to the particular windshield cleaning requirements present at the time. Thus automatic windshield cleaning during periods of both heavy and light moisture impact on the vehicle windshield may be provided by the windshield actuation system of this invention, as is automatic deactuation of the windshield drive motor upon completion of the necessary cleaning.

SUMMARY OF THE INVENTION

A windshield wiper energization system constructed in accordance with this invention is adapted for inclusion in a motor vehicle having a windshield, a windshield wiper wiping at least a portion of the windshield and an electric motor capable of driving the wiper means. The system includes an electric current source and a normally open relay switch connected in series circuit to the current source and the motor. Relay switch control means are provided for closing the relay switch upon electric current passing through the control means. A moisture sensitive switch is positioned on the vehicle windshield and has a normal open condition and a closed condition when the moisture sensitive switch senses the presence of moisture on the windshield. The moisture sensitive switch is connected in series circuit between the current source and the relay switch control means. Electrically conductive time delay means are connected in series circuit between the current source and the control means and conduct current to the latter for a predetermined time period following the cessation of the moisture sensitive switch being in the closed condition. These time delay means are connected in parallel circuit with the relay switch and the moisture sensitive switch.

DESCRIPTION OF THE DRAWING

FIG. 1 is an elevation view of a motor vehicle windshield including a moisture sensitive switch that is part of the vehicle windshield wiper energization system of this invention;

FIG. 2 is an enlarged view of the portion of FIG. 1 that is circled and identified by the numeral 2;

FIG. 3 is a section view taken along the line 3–3 of FIG. 2; and

FIG. 4 is a circuit diagram of the windshield wiper energization system of this invention.

DETAILED DESCRIPTION OF THE INVENTION

Referring now in detail to the drawing and in particular to FIGS. 1 to 3 thereof, the numeral 10 denotes motor vehicle body structure mounting a windshield 12. Also mounted by body structure 10 is a pair of windshield wipers 14 and 16 of conventional construction that are arranged to wipe a portion of the area of windshield 12. A moisture sensitive switch 18 is secured to windshield 12 such that switch 18 is located in the area of the windshield 12 that is wiped by windshield wiper 16 during the normal operating cycle of this windshield wiper.

As best may be observed from FIGS. 2 and 3, switch 18 includes a substantially planar element 20 of electrically nonconductive material such as flexible plastic sheet. Material 20 is bonded to the outside surface of windshield 12 by any suitable means such as the use of an adhesive or by heat bonding. The upper surface 21 of material 20 has formed thereon a pair of conductive elements 22 and 26. These elements may be formed on material 20 by any conventional means used in the prior art to form printed circuits, such as etching. Element 22 is substantially U-shaped and is electrically connected to a conductor 24. Element 26 extends between the arms of element 22 and is electrically connected to a conductor 28.

It thus readily may be appreciated that switch 18 is constructed such that it is a normally open moisture responsive electric switch. Elements 22 and 26 are conductors separated by a gap of nonconductive material. Upon moisture, such as rain or road spray, impacting the area of windshield 12 occupied by switch 18, the presence of a sufficient amount of moisture on switch 18 will electrically bridge the gap between elements 22 and 26 so that electric current may flow between these elements.

The function and structure of moisture responsive switch 18 in the windshield wiper energization system of this invention may be seen from the circuit diagram of FIG. 4. This system includes a source of electrical energy 30, such as an automotive battery, one pole of which is connected by a conductor 32 to ground. The other pole of current source 30 is connected by a conductor 34 to a three-position switch 36.

Switch 36 includes a movable switch arm 38 that may be positioned in contact with a switch terminal 40, in contact with a switch terminal 42 or in an open position midway between terminals 40 and 42. Switch 36 is the windshield wiper actuating switch and is located within the passenger compartment of the motor vehicle, thus giving ready access to the switch to a motor vehicle operator.

Switch contact 40 is connected to a conductor 44 that is connected to a conductor 46 that is electrically connected to an electric motor 48. Motor 48 may be of the conventional type used to drive automotive windshield wipers, such as a permanent magnet DC motor and is mechanically connected to wipers 14 and 16 to drive these wipers. Motor 48 is connected by a conductor 50 to ground.

Actuating switch terminal 42 is connected to conductor 24 that is connected, as described above to conductive element 22 of switch 18. Conductive element 26 of switch 18 is connected by conductor 28 to a relay coil 52 of a two switch relay 54 that includes switches 56 and 58 that normally are open. Switches 56 and 58 are closed, however, upon current passing through coil 52. Coil 52 is connected by a conductor 60 to ground.

One terminal of relay switch 56 is connected by a conductor 62 and a conductor 64 to conductor 34. The other terminal of relay switch 56 is connected to conductor 46. One terminal of relay switch 58 is connected by conductor 59 to conductor 28 at a point on conductor 28 between switch 18 and relay coil 52. The other terminal of relay switch 58 is connected by a conductor 66 to one terminal of a thermally responsive switch 68.

Switch 68 includes a normally closed bimetallic switch arm 69 that, when heated to a predetermined temperature, will flex away from contact with the switch terminal connected to conductor 66. Bimetallic arm 69 is connected and in proximity to a heater device 70, such as a lightbulb. (It is to be understood that means other than a lightbulb could be used as a heater to heat bimetallic switch arm 69. For instance, switch arm 69 could be formed in part of material capable of resistance heating when electric current passes therethrough.) Heating device 70 is connected by a conductor 72 to conductor 64.

The operation of the windshield wiper energization system illustrated in FIG. 4 is as follows. If the motor vehicle operator desires continuous operation of motor 48 to drive windshield wipers 14 and 16, switch arm 38 of switch 36 is positioned in contact with switch terminal 40. With switch arm 38 in this position, electric current from current source 30 passes through conductor 34, switch 36, conductor 44 and conductor 46 to motor 48. With the switch arm in this position, motor 48 will operate continuously for a continuous repetition of the wiping cycle of windshield wipers 14 and 16 until such time as the vehicle operator moves switch arm 38 out of contact with terminal 40.

If the vehicle operator desires automatic operation of windshield wipers 14 and 16 to accommodate windshield wiping requirements of varying characteristics, switch arm 38 is placed in contact with switch terminal 42. As long as no moisture bridges the nonconductive gap between elements 22 and 26 of switch 18, no current flows through the circuit because switches 56 and 58, as well as switch 18, are open. Upon moisture bridging the gap between elements 22 and 26 of switch 18 as may occur when rain or road spray impacts windshield 12, switch 18 is closed and current flows from current source 30 through conductor 34, switch 36, conductor 24, switch 18, conductor 28 and through relay coil 52.

Upon current flowing through relay coil 52, this coil operates immediately to close switches 56 and 58. Since switch 56 then is closed, current flows from current source 30 through conductor 34, conductor 64, conductor 62, switch 56 and conductor 46 to motor 48 to begin the operation of motor 48 and the wiping of windshield 12 by wipers 14 and 16.

Although switches 68 and 58 are closed at this time, an insignificant amount of current flows through these switches. This is because the resistance of heat generating element 70 is very great compared to the resistance of switch 18. Thus the electrical potential in conductor 72 is approximately the same as electrical potential of the electrical conductor 28 at the point of junction between conductor 28 and conductor 69. Any small amount of current that does flow through switches 68 and 58 is so minute that it is insufficient to cause heating element 70 to begin the generation of heat. Thus we may consider, for practical purposes, that no current at all is flowing through heating element 70 at this time.

Upon the moisture bridging the gap between the conductive elements of switch 18 being removed, either by wiper 16 or by the cessation of moisture being impacted against windshield 12, switch 18 will return to an open condition such that no current flows to relay coil 52. Instantaneously, before switches 56 and 58 can open, current will flow from current source 30 through conductors 34, 64, 72, heating element 70, switch 68, conductor 66, switch 58 and conductor 59 to conductor 28 and through coil 52 so that switches 56 and 58 remain closed. This current flows through the circuit branch immediately described above due to the fact than when switch 18 opens, conductor 28 immediately has an electrical potential of zero.

As current flows through heating element 70, the temperature of bimetallic switch arm 69 positioned in proximity to heating element 70 begins to rise. After a predetermined period of time, bimetallic switch arm 69 will flex a sufficient distance such that switch 58 becomes open. At this time the flow of current through relay coil 52 is interrupted so that switches 56 and 58 open. Due to the opening of switch 56, electric current no longer reaches motor 48 so that this motor and windshield wipers 14 and 16 no longer operate. At this time, all parts of the circuit have returned to their original position.

It thus may be seen that the operation of motor 48 is not terminated immediately when moisture no longer is sensed by switch 18, but continues for a predetermined time period until the heat generated from heating element 70 is sufficient to flex bimetallic switch 69 so that switch 68 becomes open. The time delay feature of this system provides that windshield 12 will be completely cleaned by the windshield wipers 14 and 16 regardless of whether or not moisture is present on the area of the windshield occupied by switch 18. It is, of course, possible that although moisture has been wiped from switch 18, residual moisture that may be partially removed or otherwise in contact with windshield 12 has not as yet been wiped from the windshield. In the event of a continuous rain, the time delay feature of the circuit of FIG. 4 will not commence operation until the cessation of rain impacting switch 18. This is because intermittent sensing of moisture by switch 18 will cause heating element 70 to generate heat only intermittently. Such an intermittent generation of heat by element 70 is insufficient to cause switch 68 to open. Heating element 70 and bimetallic arm 68, as well as their relative positions, are chosen empirically in order to give whatever time delay is desired.

It thus may be seen that this invention provides an energization system for a motor vehicle windshield wiper so that the motor vehicle operator may select either continuous windshield wiper operation or automatic commencement as windshield wiping requirements dictate. This latter selection by the vehicle operator entails only that he make an initial positioning of the windshield wiper actuation switch within the vehicle passenger compartment. After this initial setting of the actuation switch is made, all further operations of the system of this invention occur automatically.

I claim:

1. A windshield wiper energization system for a motor vehicle having a windshield, windshield wiper means capable of wiping at least a portion of said windshield and an electric motor capable of driving said wiper means, said system including an electric current source, a relay switch coupled to said current source and said motor and capable of conducting current between the former and the latter, said relay switch being biased into an open position, moisture responsive second switch means mounted on said windshield at a point wiped by said windshield wiper and coupled to said current source, said second switch means transmitting current therethrough upon sensing moisture, a relay coil coupled to said second switch means and closing said relay switch upon receiving current, and switch control time delay means coupled to said relay coil and said current source and conducting current to said relay coil for a predetermined time period after moisture no longer is sensed by said second switch means, said relay coil and said second switch means being connected in series circuit, said relay coil and said time delay means being connected in series circuit, and said second switch means and said time delay means being connected in parallel circuit.

2. A windshield wiper energization system for a motor vehicle having a windshield, windshield wiper means wiping at least a portion of said windshield and an electric motor capable of driving said wiper means, said system including an electric current source, a normally open relay switch connected in series circuit between said current source and said motor, relay switch control means closing said relay switch upon electric current passing through said control means, a moisture sensitive switch positioned on said windshield and having a normal open condition and a closed condition upon sensing the presence of moisture on said windshield, said moisture sensitive switch being connected in series circuit between said current source and said control means, and electrically conductive time delay means connected in series circuit between said current source and said control means and conducting current to the latter for a predetermined time period following the cessation of said moisture sensitive switch being in the closed condition.

3. The windshield wiper energization system of claim 2, wherein said time delay means are in parallel circuit with said relay switch and said moisture sensitive switch.

4. The windshield wiper energization system of claim 2, wherein said moisture sensitive switch is positioned on said windshield at a location wiped by said windshield wiper means.

5. The windshield wiper energization system of claim 2, wherein said moisture sensitive switch comprises a pair of electrically conductive contacts separated by an electrically nonconductive gap, said moisture sensitive switch being in the closed condition upon moisture bridging said gap.

6. The windshield wiper energization system of claim 2, wherein said time delay means comprises a normally closed heat responsive switch that opens upon being heated to a predetermined temperature, a resistance heating element, and a normally open second relay switch that is closed upon current passing through said control means, said heat responsive switch, heating element and second relay switch being connected in series circuit.